SWITCHING CIRCUIT

Filed April 2, 1959 2 Sheets-Sheet 1

INVENTOR
M. A. TOWNSEND
BY
R. C. Winter
ATTORNEY

Dec. 3, 1963 M. A. TOWNSEND 3,113,183

SWITCHING CIRCUIT

Filed April 2, 1959 2 Sheets-Sheet 2

INVENTOR
M. A. TOWNSEND
BY
R. C. Winter
ATTORNEY 3,113,183
Patented Dec. 3, 1963

3,113,183

SWITCHING CIRCUIT

Mark A. Townsend, Summit, N.J., assignor to Bell Telephone Laboratories, Incorporated, New York, N.Y., a corporation of New York Filed Apr. 2, 1959, Ser. No. 803,616
19 Claims. (Cl. 179—18)

This invention relates to electrical switching systems, and more particularly to time division telephone switching systems including gating networks. In present day high speed information handling systems, a practice employed in transferring information from one locality to another is time sharing or time division multiplexing, which practice permits the simultaneous exchange of information between communicating pairs of a plurality of terminals over a common communication link.

This practice requires that each terminal or each pair of terminals in communication be assigned a cyclically recurring discrete time interval or time slot during which information may be sampled and received. In the interval between appearances of the time slot assigned to a particular terminal or pair of terminals, the common communication link is available to other communicating terminals. By sampling at a sufficiently rapid rate, an accurate reproduction of the information transmitted from one terminal of a communicating pair may be formed at the other terminal of the pair.

This technique may be utilized, for example, in telephone systems where a plurality of subscriber lines may be interconnected via a common communication link, thereby conserving expensive transmission facilities. A system of this type is described in a patent application of D. B. James, J. D. Johannesen, M. Karnaugh and W. A. Malthaner, Serial No. 760,502, filed September 11, 1958, now Patent 2,957,949, issued October 26, 1960.

An essential part of such a system is a high speed data storage unit which, in conjunction with appropriate translation components, permits sampling of the desired subscriber lines during the assigned time slots. Thus the data storage unit remembers which line or lines are to be sampled in each cyclically recurring time slot and at the appropriate time activates translation units to enable line gates in the selected lines, thereby to connect the selected lines to the common communication link.

The arrangement of the system disclosed in the James et al. patent is such that the data storage unit or memory operates to connect a pair of communicating lines to the common communication link during the same time slot. Thus the system may be said to operate on the basis of a time slot per conversation. It is necessary, therefore, in the organization of this system that the memory be capable of storing sufficient information for the simultaneous sampling of two different lines. As these lines in communication may be located in line concentration areas remote from one another, a distinct translator is required for each remote area to direct the sampling of the lines in its area. Thus in this instance at least two translators are required to operate in conjunction with the memory unit.

Frequently one subscriber in a remote area desires to talk to another subscriber in the same remote area. The system in the James et al. patent is arranged to complete such a connection only through the central office control equipment. Thus an information sample from one subscriber's line during the assigned time slot is transferred over the common communication link to a storage point at the central office and is again transferred over the common communication link to the other subscriber's line during a different time slot. The arrangement does not permit a direct interchange of sampled information between two subscribers in the same remote area in the same time slot.

The accomplishment of such a direct information interchange between subscribers in the same remote area, commonly referred to as Private Branch Exchange or intra-concentrator call, thus requires the same central office control equipment in the James et al. system as required on an inter-concentrator call between subscribers in different remote concentrator areas. Such equipment includes a memory containing the addresses of both communicating lines, access circuitry to transmit the addresses to separate translators, each in the remote area of one of the communicating lines, and the distinct translators themselves.

It is a general object of my invention to provide an improved signal transmission system.

More specifically, it is an object of my invention to provide an improved time division communication system capable of transmitting information between a plurality of pairs of communicating subscriber lines over a common communication link.

It is another object of my invention to provide improved Private Branch Exchange telephone system operation.

It is still another object of my invention to provide a more economical Private Branch Exchange time division telephone communication system.

These and other objects are attained in one specific illustrative embodiment wherein a time division communication system of the type described in the aforementioned James et al. patent comprises, in accordance with my invention, a plurality of subscriber line gates connected between corresponding telephone subscriber lines and a common communication link. Each subscriber line comprises a repeat coil connected to the terminal and a filter connected between the repeat coil and the line gate.

The subscriber line gates required in such a time division switching network necessarily have the characteristics of essentially infinite impedance to current flow in either direction when in the nonconducting state, essentially zero impedance in both directions when in the conducting state, electronic operation to enable switching at high speeds, and isolation of the current transmission path from the gate control circuitry. A gate suitable for this purpose is disclosed in J. D. Johannesen, P. B. Myers and J. E. Schwenker application Serial No. 570,530, filed March 9, 1956, now Patent No. 2,899,570 issued August 11, 1959. In this instance a two-transistor transmission gate is indicated, with a control signal applied between the base and emitter of each transistor.

In accordance with my invention, each line gate has a temporary memory element connected in the control signal path of each transistor. The temporary memory element associated with a selected line gate is preset or activated by a signal from the translator. Such a translator output signal enables the selected line gate in the James et al. telephone system directly, but in this instance it merely activates the temporary memory preparatory to enablement of the line gate. Actual enablement of the line gate is accomplished at a later time by a signal applied to all of the temporary memory elements in common, which signal serves to enable only those line gates in which the temporary memory element has been activated. Thus the temporary memory element also acts as a gate or switch which controls the operation of the line gate. In this fashion the line gates associated with a plurality of subscriber lines in communication may be prepared for operation at different times but enabled simultaneously.

For Private Branch Exchange or intra-concentrator telephone communication, this arrangement permits the translation of each subscriber line address and its application to the appropriate lines in the same remote area in sequence through a single translator. Thereafter, a single triggering pulse applied to all subscriber line gates in the remote area serves to enable the preset line gates to produce an interchange of information samples between the communicating subscribers without requiring passage of the samples between the remote area and the central office. In addition, the line address information for each of the lines in communication is stored in a central memory in sequence, thereby providing a compact and economical memory unit.

It is a feature of this invention that each line circuit in a time division communication system comprise a line gate having a temporary memory element connected in the control circuit.

It is another feature of this invention that line address information be applied from a translator to the line circuit in a manner to activate or preset the temporary memory element without enabling the line gate.

It is a further feature of this invention that a gate enabling pulse be applied in common to each of the line circuits in a manner to enable only those line gates having an activated temporary memory element connected thereto.

A complete understanding of these and other features of this invention may be gained from consideration of the following detailed description, together with the accompanying drawing, in which.

Figure 1:
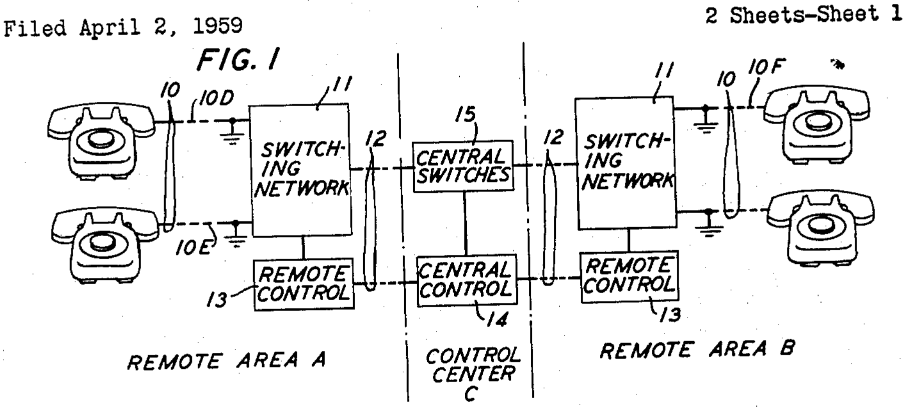
FIG. 1 is a schematic representation in block form of a telephone system in which a gating arrangement in accordance with this invention may be employed.

Turning now to the drawing, the basic elements of a time division telephone communication system in which my invention may be incorporated are depicted in FIG. 1. This system is disclosed in the aforementioned James et al. patent. As shown therein, a plurality of subscriber lines 10, grouped in proximity in remote concentrator areas A and B, are selectively connected by a switching network 11 to a switching and control center C over common transmission and control links 12. Equipment in central control 14 is operated, for example, in accordance with signals from a subscriber line 10D in remote area A, to complete a connection through the central switches 15 to a called subscriber line 10E in the same remote area A, to a called subscriber line 10F in remote area B, or over trunks to other remote areas and foreign telephone systems.

The system is operated on a time division multiplex basis in which each subscriber line 10 desiring service is assigned a particular sampling period or time slot in a recurrent cycle of time slots. Upon each occurrence of a time slot assigned to a particular calling subscriber line, such as 10D, a sample of information is transmitted from his telephone through the switching network 11 to the common transmission link 12 and through the same or a similar switching network 11 to the called subscriber line 10E or 10F. Considering that the called subscriber may be located in another remote concentrator area or a foreign telephone system, such signal samples are transmitted over the common link 12 to the central switches 15 and are thereafter disseminated to the desired terminal point.

Information as to the condition of a subscriber line 10; e.g., idle, busy on an established connection or desiring to have a connection established to it, is obtained by the remote concentrator control 13 connected between the remote switching network 11 and the central control 14 by a control lead of the common communication link 12.

The remote control 13 contains, among other elements, a translator circuit which transmits control signals to selected line gate circuits in the switching network 11 upon receipt of directive signals from the central control 14. The resultant connections and disconnections of the line gate circuits occur rapidly and in a selected sequence for precisely timed intervals during which signal samples are transferred between the subscriber lines 10 and the common communication link 12.

Figure 2:
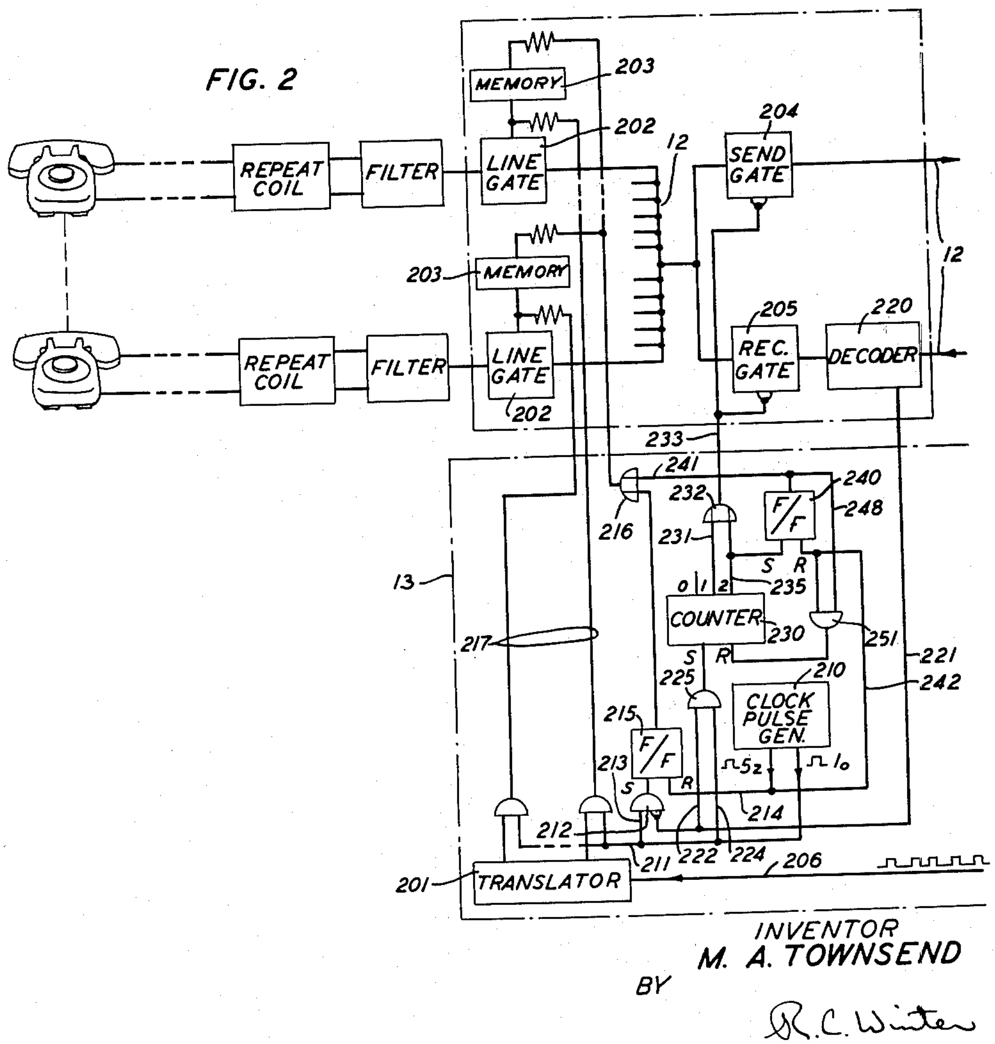
FIG. 2 is a schematic representation of a time division gating arrangement in accordance with this invention that may be employed in the telephone system of FIG. 1.

The operation of elements in the remote concentrator control 13, in accordance with this invention, is best shown in FIG. 2. The translator 201 receives line address information from the line address storage memory at the central office on lead 206 in the form of a series of binary code impulses. The translator 201 stores this information until the proper moment for initiation of a line gate address signal on lead 211 from clock pulse generator 210, at which time the translator is directed by the particular stored address to steer a control signal to the particular line gate 202 corresponding to this stored address. Enablement of a line gate 202 in this fashion permits transfer of information stored in the particular line circuit to the common communication link 12.

In accordance with the James et al. system operation, the Send gate 204 is enabled simultaneously with the enablement of the selected line gate 202 so as to transfer the information sample from the line circuit to that portion of the common communication link 12 interconnecting all of the local lines with the remote central office. Upon disablement of the Send gate 204, a Receive gate 205 is enabled so as to transfer an information sample from the common link 12 to the local line circuit through the line gate 202. Thereafter the line gate is disabled by removal of the control signal. In this fashion conversations may proceed between parties in the local area but only by transfer of the speech samples over that portion of the common communication link connecting the local area to the central office.

Circuitry is provided, in accordance with my invention, to permit conversations between parties in the local area without necessitating transmission of the information samples to and from the central office. Each of the line circuits includes a temporary memory element 203 which is connected to the control circuit of the associated line gate 202. The translator 201 directs its output signal to the line gate 202 in the same manner as described hereinbefore, but in this instance the translator output signal is of a polarity which fails to enable the line gate. Instead the translator output signal activates or presets the temporary memory element 203 in the control path of the line gate 202 so as to permit enablement of the line gate only upon receipt of a subsequent enabling signal.

The timing may be established such that the line gates associated with the active pair of subscriber lines are addressed in sequence, and thereafter an enabling signal which is applied concurrently to all temporary memory elements 203 will enable only the preset pair of line gates 202 so as to transfer information directly between them.

Figure 4:
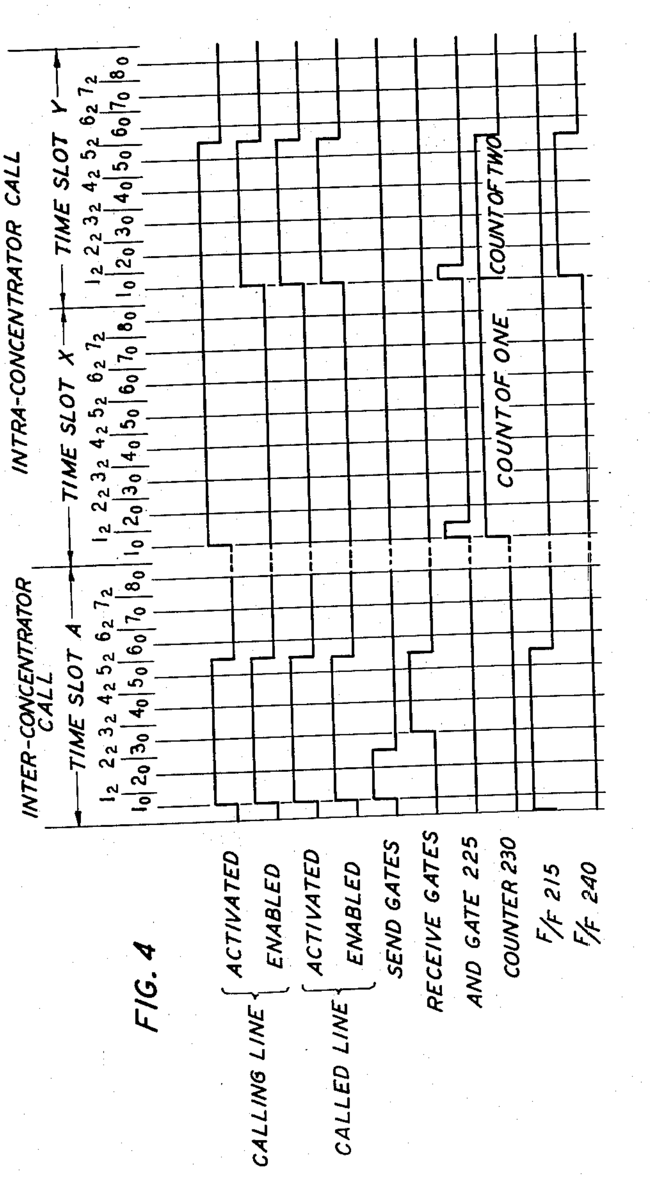
FIG. 4 is a diagram of the timing pulses and their functions pertaining to the system depicted in FIG. 2.

The circuitry disclosed in FIG. 2, including the novel line circuit, indicates one manner for accomplishing the desired result in the James et al. system. The detailed operation is best described with reference to this circuitry in conjunction with the timing diagram of FIG. 4. Each time slot interval, as indicated in FIG. 4, is divided into a plurality of control pulse intervals. Thus pulses are available at sixteen distinct times during each time slot to control various operations during the time slot. The time for appearance of each control pulse is designated in FIG. 4 as time $1_0$ through time $8_0$ and time $1_2$ through time $7_2$, each of the latter times appearing halfway between two of the former times. Of course my invention is not confined to this specific timing arrangement, but it serves to illustrate the application of my invention in the James et al. system which does employ such a timing arrangement.

On a call between a subscriber in the local area and a subscriber in an area remote from this local area, termed an inter-concentrator call, sampling of the conversation proceeds in the following manner:

Prior to the appearance of the time slot A, FIG. 4, assigned to this conversation, the address of the local line, referred to as the calling line, is stored in the translator 201 by transfer of the appropriate address information from the memory at the central office over the control lead of the common communication link and lead 206. At time $1_0$ in the time slot interval A, FIG. 4, a signal from clock pulse generator 210 in the remote area control 13 is directed to the output of translator 201 over lead 211 and to inhibit gate 212 over lead 213. This signal on lead 211 is effective to gate the output of the translator 201 to the line circuit of the calling party over the corresponding lead 217. This control pulse is of such polarity as to activate the temporary memory 203 in the calling line circuit, while leaving the associated line gate 202 disabled. Thus the calling line temporary memory is activated at time $1_0$ in time slot A, FIG. 4.

Simultaneously with this operation, the clock pulse at time $1_0$ on lead 213 passes through the inhibit gate 212 and sets the flip-flop 215 so as to apply a line gate enabling signal through OR gate 216 to the temporary memory 203 in each of the line circuits in the local area. Such a signal will be blocked by the temporary memory 203 in each line circuit with the exception of those in which the temporary memory was activated by the translator output. In the latter case the line gate enabling signal will be transmitted through the activated temporary memory 203 to enable the associated line gate 202. Thus in the local area, only the line gate 202 of the calling line is enabled at this time. In FIG. 4 this operation is indicated by the calling line gate being enabled at time $1_0$ in time slot A.

A similar operation is effected in the remote area in which the line circuit of the called party is located. Thus, in this instance, the line gates of each of the calling and called parties are activated and enabled simultaneously at time $1_0$ in time slot A, FIG. 4.

The Send gate 204 is also enabled at time $1_0$ of time slot A so as to transfer a sample of the information on the calling line to that portion of the common communication link 12 connected to the central office. The Send gate is disabled at time $2_2$, FIG. 4, and the Receive gate 206 is enabled at time $3_0$ while the calling line gate 202 remains enabled so as to transfer an information sample received from the called party over the common communication link 12 to the calling line. The control circuitry for Send and Receive gate operation is not disclosed herein but it is fully described in the aforementioned James et al. patent.

Thereafter, at time $5_2$ in time slot A, a signal from clock pulse generator 210 is transmitted over lead 214 to reset flip-flop 215, thereby removing the line gate enabling signal and restoring all enabled line gates. As noted in FIG. 4, this completes the basic sample transfer operations for an inter-concentrator call in time slot A.

The operation performed in the remote area control 13 in the processing of a call between two subscribers in the same local area remote from the central office, termed a PBX or inter-concentrator call, is described hereinafter:

The memory and common control circuitry at the central office, in detecting the presence of a request for establishment of such a call, transmits an appropriate indication to the remote area where it is stored; for example, in a memory unit of the decoder 220. The operation of the decoder 220, as described in detail in the James et al. patent, is disclosed herein merely to indicate an available storage means. Such storage is effected prior to the time interval assigned to this intra-concentrator call. In addition, the central memory is arranged such that the line address of the called party is stored therein immediately following the stored line address of the calling party. Thus the translator 201 will receive the line addresses for the calling and called parties in sequence.

Upon receipt and storage in the translator 201 of the line address for the calling party, the signal from clock pulse generator 210 at time $1_0$ in the time slot interval X, FIG. 4, assigned to this conversation, is again effective over lead 211 to gate the calling line address out of the translator 201. However, the information priorly stored in the decoder 220, indicating an intra-concentrator call, is effective to activate the inhibit lead 221 so as to prevent passage of the signal at time $1_0$ on lead 213 through inhibit gate 212.

The output of the translator 201 serves to activate the temporary memory 203 associated with the calling line gate 202 as before, but the line gate enabling signal fails to appear, due to the action at inhibit gate 212. Thus the only line circuit operation occurring during time slot X, FIG. 4, is activation of the calling line memory 203.

The intra-concentrator call indication stored in the decoder 220 is also available over leads 221 and 222 at AND gate 225 where it coincides with the clock pulse at time $1_0$ from generator 210 on lead 224, thus providing an output from AND gate 225 to set the counter 230 from its "zero" position to its "one" position. The counter output lead 231 is energized in this position and provides a signal through OR gate 232 and over lead 233 to inhibit inputs on the Send and Receive gates, serving to prevent their operation at this time.

The central memory begins transmitting the address of the called line to the translator 201 immediately following the gating of the calling line address therefrom. A clock pulse from generator 210 on lead 211 at time $1_0$ of the next time slot Y, FIG. 4, serves to gate this called line address from the translator 201 to the called line gate 202 to activate its temporary memory 203. Simultaneously, the clock pulse at time $1_0$ will be transmitted over lead 224 to provide another output from AND gate 225 in conjunction with the signal from decoder 220 over leads 221 and 222. The AND gate 225 output at time $1_0$ of time slot Y serves to move the counter 230 to its "two" position. In this position the counter 230 transfers its output signal to lead 235 so as to maintain the Send and Receive gates inhibited through OR gate 232 and to set the flip-flop 240. The flip-flop 240 provides an output signal on lead 241 which is effective through OR gate 216 to apply the line gate enable signal to the temporary memory 203 associated with each of the line gates 202 in the local concentrator area. As the calling and called subscriber lines are the only ones which have the associated temporary memory activated at this time, these lines alone are enabled during time slot Y.

After allowance of sufficient time to complete the transfer of information samples between the calling and called lines; for example at time $5_2$ in time slot Y, a clock pulse from generator 210 serves to reset the flip-flop 240 over lead 242 and, in conjunction with the flip-flop 240 output pulse on lead 248, permits an output signal from AND gate 251, which serves to reset the counter 230 to its "zero" position, thereby removing the line gate enabling signal from lead 241. This action serves, in turn, to restore all priorly enabled line gates 202 and all priorly activated temporary memory elements 203 to their normally unactivated conditions.

Advantageously, in accordance with my invention, the temporary memory 203 associated with each line gate 202 may comprise a semiconductor device having a PNPN configuration as known in the art and disclosed, for example, in W. Shockley Patent 2,855,524, issued October 13, 1953. Such a device exhibits at least one high impedance junction to current flow in either direction through the device. However, the device will maintain its high impedance only so long as the voltage across its terminals remains below a first threshold. Once the first threshold value is exceeded, the device reverts to a low impedance state, in which it remains until the voltage across its terminals declines to a second threshold value substantially below the first threshold and near zero. Thus the PNPN is well suited to perform the line circuit storage and switching functions in accordance with my invention.

Figure 3:
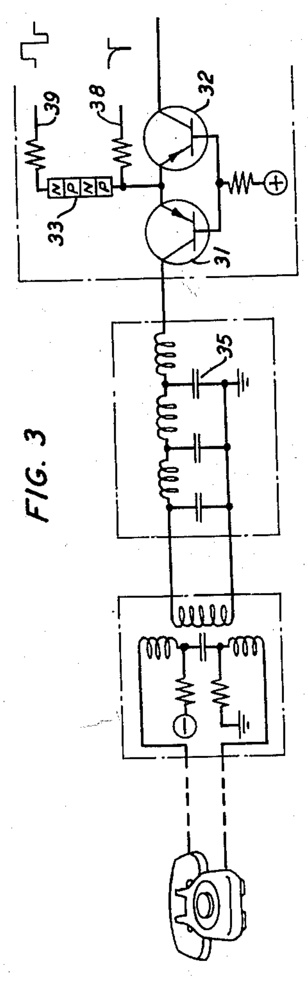
FIG. 3 is a detailed schematic representation of a line circuit embodied in the arrangement of FIG. 2.

The line gate depicted in FIG. 3 comprises two transistors 31 and 32, having common emitter and common base connections. When the emitter-base bias in the quiescent, high impedance state is overcome, the transistor combination is reduced to a low impedance state, permitting bilateral conduction between the line circuit connected to the collector of transistor 31 and the common communication link connected to the collector of the transistor 32. In this fashion the line gate may be controlled to permit transfer of signal samples to and from the line storage capacitance 35 during discrete sampling intervals determined by the duration of the control signal applied to overcome the base-emitter bias.

In prior systems, such as that disclosed in the aforementioned James et al. patent the control signal from the translator serves to overcome the base-emitter bias of the line gate transistors and thus must be of sufficient duration to permit the necessary signal sample transfers. In accordance with my invention, the translator output signal does not enable the line gate, but serves merely to activate the temporary memory unit associated with the line gate. Thus in FIG. 3, an abrupt negative pulse from the translator is applied over lead 38 to the connection between one terminal of the PNPN device 33 and the common emitter electrodes of the selected line gate transistors 31 and 32. This pulse need only have sufficient duration to break down the device 33 to its low impedance state and has no effect on the line gate transistors other than to increase the bias already present on the emitter-base junctions. Once the device 33 has been activated by the pulse on lead 38, a line gate enabling signal on lead 39 will be free to pass through the device 33 to enable the associated line gate. The enabling signal advantageously is shaped such that its trailing edge drops below the second threshold of the device so as to permit its restoration to the high impedance condition.

The line gate may, for interconcentrator calls, be enabled immediately by application of the enabling signal on lead 39 simultaneously with application of the translator output signal on lead 38. However, for intra-concentrator calls, this control signal may be withheld, as described hereinbefore, until the proper pair of line circuits have been preset by sequentially applied translator output signals.

Similarly, a conference call among any number of subscribers may be effected by deferring application of the enabling signal until the line circuits of all conferees have been preset.

It is to be understood that the above-described arrangements are illustrative of the application of the principles of the invention. Numerous other arrangements may be devised by those skilled in the art without departing from the spirit and scope of the invention.

What is claimed is:

1. In a time division communication system, a plurality of subscriber line gates, a link common to said plurality of line gates, a signal responsive element individual to each of said line gates, means for applying signals to selected ones of said signal responsive elements in individual successive time intervals for priming each gate associated with said selected elements, and means for connecting said primed gates to said common link in a distinct time interval which recurs in each cycle of a repetitive cycle of time intervals.

2. A communication system comprising a common communication link, a plurality of lines, each of said lines comprising gating means connected to said link, means for applying activating signals to said gating means in a selected plurality of said lines in successive distinct time intervals, and means for enabling said activated gating means concurrently in a subsequent distinct time interval, both of said time intervals each being recurrent in a repetitive cycle of time intervals.

3. A communication system in accordance with claim 2 wherein said gating means in each line comprises a line gate connected to said common link and means for controlling the operation of said line gate comprising a control circuit including switching means.

4. A communication system in accordance with claim 3 wherein said activating means comprises an activating signal source and means for applying signals from said source in sequence to said switching means in said selected lines.

5. A communication system in accordance with claim 4 wherein said activating means further comprises an enabling signal source and means for applying a signal from said enabling signal source concurrently to said switching means in each of said lines.

6. A communication system in accordance with claim 5 wherein said switching means comprises a PNPN semiconductive device, means connecting said activating signal source to one terminal of said device and means connecting said enabling signal source to another terminal of said device.

7. A time division communication system comprising a plurality of subscriber lines, a control center remote from said subscriber lines, a common communication link, gating means individual to said subscriber lines and connected between said subscriber lines and said link, means comprising means in said control center for activating a selected plurality of said individual gating means in successive distinct time intervals, and means for enabling said activated gating means to connect the corresponding subscriber lines to said common link in a distinct time interval of a repetitive cycle of time intervals, said last-mentioned means comprising an enabling signal source and means for applying a signal from said enabling signal source simultaneously to each of said gating means.

8. In a time division communication system, a plurality of lines, each comprising a line gate, switching means in the control circuit of each of said line gates, a common communication link connected to each of said line gates, and means for enabling selected ones of said line gates during a distinct time interval in a repetitive cycle of time intervals to establish a connection through said link between the lines corresponding to said selected line gates, said last-mentioned means comprising first and second signal sources, means for applying a signal from said first source to said switching means in the control circuit of each of said selected line gates in distinct successive time intervals and means for applying a signal from said second source simultaneously to each of said switching means.

9. In a time division telephone system, a gating circuit comprising a transistor gate connected in a transmission path so as to present a normally high impedance to signals in said transmission path, and means distinct from said transmission path, for reducing the impedance of said gate to enable passage of signals in said transmission path, said last-mentioned means comprising; a two-terminal semi-conductive device connected to said gate having a normally high impedance state and being settable to a low impedance state, a first signal source connected to a common junction of said device and said gate, means for applying an activating pulse to said device from said first source to set said device in a low impedance state, and a second signal source connected to the remaining terminal of said device for applying signals from said second source through said device whereby the impedance of said transistor gate is reduced.

10. A time division telephone system in accordance with claim 9 wherein said semiconductive device comprises a PNPN diode.

11. A time division telephone system comprising a common communication link, a plurality of subscriber lines, each comprising gating means connected to said common communication link, a control center remote from said subscriber lines and comprising means for storing in sequence designations of each of said subscriber lines, means connected to said storage means for translating each of said stored designations as received in sequence, and means for applying enabling signals to said first gating means to permit transfer of information from preselected ones of said lines to said link, said last-mentioned means comprising an enabling signal source, second gating means connected between said enabling signal source and said first gating means and means for activating said second gating means to pass signals from said enabling signal source to said first gating means including means for applying the output of said translating means to said second gating means.

12. A time division telephone system in accordance with claim 11 wherein said second gating means comprises a two-terminal device, one terminal being connected to said enabling signal source and the other terminal being connected in common to said gating means and said translating means.

13. A time division telephone system in accordance with claim 12 wherein said second gating means comprises a PNPN diode.

14. A time division communication system comprising a common communication link, a plurality of subscriber lines, each of said lines including a line gate, common transmission means connected to said link and including common gate means for establishing a connection between any of said lines and said transmission means, and means for establishing connections directly between a pair of said subscriber lines without utilization of said transmission means, said last-mentioned means including memory means connected to each of said line gates, means for activating one of said memory means during one time slot of the time division communication system time cycle and means for simultaneously activating another of said memory means and applying an enabling pulse to all of said line gates during another time slot of said cycle.

15. A time division communication system in accordance with claim 14 further comprising means for inhibiting operation of said common gate means during establishment of a connection directly between said pair of subscriber lines.

16. A time division communication system comprising a plurality of subscriber lines, each of said lines including a line gate, a distinct memory element connected to each of said line gates, means for activating said memory element to prime said line gate, and means for applying an enabling signal through said activated memory element to enable said primed line gate.

17. A line concentrator telephone system comprising a plurality of subscriber lines having no individual direct connections to a remote central office, common transmission means for connecting said lines to the remote central office, means for connecting individual of said subscriber lines to said common transmission means under control of signals from the central office, and means for establishing a connection directly between two of said subscriber lines exclusive of said common transmission means and under control of signals from the central office.

18. A line concentrator telephone system comprising a plurality of subscriber lines having no individual direct connections to a remote central office, common transmission means for connecting said lines to the central office, and line concentrator control means for connecting individual of said subscriber lines to said common transmission means in response to control signals from the central office, said concentrator control means further including means responsive to signals from the central office for establishing a speech communication connection directly between two of said subscriber lines without utilization of said common transmission means.

19. A time division telephone system comprising a plurality of subscriber lines, common transmission means for connecting said lines to a remote central office, means for connecting individual of said subscriber lines to said common transmission means in distinct time intervals of the time division system in response to control signals from the central office, and means for establishing a speech communication connection in a single time interval of the time division system directly between two of said subscriber lines without utilization of said common transmission means and in response to signals from the remote central office.

References Cited in the file of this patent

UNITED STATES PATENTS

| | | |
|---|---|---|
| 2,037,221 | Evers | Apr. 14, 1936 |
| 2,490,833 | Ransom | Dec. 13, 1949 |
| 2,619,548 | Lesti | Nov. 25, 1952 |
| 2,691,073 | Lowman | Oct. 5, 1954 |
| 2,747,021 | Chubb et al. | May 22, 1956 |
| 2,870,259 | Norris | Jan. 20, 1959 |
| 2,889,407 | Trousdale | June 2, 1959 |
| 2,910,540 | Van Mierlo et al. | Oct. 27, 1959 |
| 2,958,847 | Johnson | Nov. 1, 1960 |